United States Patent
Song et al.

(10) Patent No.: US 9,353,694 B2
(45) Date of Patent: May 31, 2016

(54) INTAKE TEMPERATURE CONTROL SYSTEMS AND METHODS FOR INTAKE MANIFOLD PROTECTION

(71) Applicant: GM Global Technology Operations LLC, Detroit, MI (US)

(72) Inventors: B. Jerry Song, Novi, MI (US); Gregory J. York, Fenton, MI (US); Jon C. Wasberg, Davison, MI (US); Josef J. Correia, Waterford, MI (US); Timothy Ward Athan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 363 days.

(21) Appl. No.: 13/919,236

(22) Filed: Jun. 17, 2013

(65) Prior Publication Data

US 2014/0372009 A1 Dec. 18, 2014

(51) Int. Cl.
  *F02D 41/00* (2006.01)
  *F02D 9/02* (2006.01)
  *F02D 41/14* (2006.01)

(52) U.S. Cl.
  CPC .......... *F02D 41/0052* (2013.01); *F02D 41/005* (2013.01); *F02D 41/1441* (2013.01); *F02D 41/0072* (2013.01); *F02D 2009/0277* (2013.01); *F02D 2041/0067* (2013.01); *F02D 2200/0402* (2013.01); *F02D 2200/0414* (2013.01); *F02D 2200/0416* (2013.01); *Y02T 10/47* (2013.01)

(58) Field of Classification Search
  CPC .............. F02D 41/0052; F02D 41/005; F02D 41/0072; F02D 41/0065; F02D 41/0067; F02D 41/1144; F02D 41/1441; F02D 2200/0402; F02D 2200/0416; F02D 2200/0414; F02D 2041/0067; F02D 2041/0017; F02D 2009/0222; F02D 2009/0223; F02D 2009/0225; F02D 2009/0276; F02M 25/0702; F02M 25/0754; F02M 2025/0762; F02M 2025/0728; F02M 35/10373
  USPC ............... 73/114.34; 701/108; 60/605.3, 321, 60/320; 123/568.17, 568.12, 568.21, 542
  See application file for complete search history.

(56) References Cited

U.S. PATENT DOCUMENTS

| 2,054,997 | A  | * | 9/1936  | Vang .............................. 123/545 |
| 4,164,032 | A  | * | 8/1979  | Nohira et al. .................. 701/108 |
| 4,977,743 | A  | * | 12/1990 | Aihara et al. ................. 60/605.3 |
| 5,109,809 | A  | * | 5/1992  | Fujimoto .................... 123/41.31 |
| 5,921,224 | A  | * | 7/1999  | Sinnamon ................ 123/568.21 |
| 6,209,530 | B1 | * | 4/2001  | Faletti et al. ............. 123/568.21 |
| 7,287,523 | B1 |   | 10/2007 | Fonville |
| 8,042,527 | B2 | * | 10/2011 | Styles et al. ............. 123/568.12 |
| 2005/0138918 | A1 | * | 6/2005 | Fukuzumi et al. .............. 60/278 |
| 2007/0199320 | A1 | * | 8/2007 | Yager et al. ..................... 60/599 |

(Continued)

FOREIGN PATENT DOCUMENTS

CN          101054935 A        10/2007

*Primary Examiner* — Lindsay Low
*Assistant Examiner* — George Jin

(57) ABSTRACT

An engine control system of a vehicle includes a first temperature module, a second temperature module, and an exhaust gas recirculation (EGR) control module. The first temperature module determines a temperature of gas within an intake manifold of an engine. The second temperature module determines a temperature of an EGR conduit that is coupled to the intake manifold. The EGR control module reduces opening of an EGR valve when the temperature of the gas and the temperature of the conduit is greater than a predetermined temperature.

21 Claims, 5 Drawing Sheets

(56) References Cited

U.S. PATENT DOCUMENTS

| | | | |
|---|---|---|---|
| 2007/0215095 A1* | 9/2007 | Kakuya et al. | 123/295 |
| 2007/0240689 A1* | 10/2007 | Fonville | 123/568.18 |
| 2008/0295813 A1* | 12/2008 | Yamanaka et al. | 123/568.17 |
| 2010/0043525 A1* | 2/2010 | Recouvreur | F01N 11/002 73/23.31 |
| 2013/0111898 A1* | 5/2013 | Dale | 60/599 |
| 2013/0192569 A1* | 8/2013 | Seiberlich | 123/568.26 |
| 2013/0343421 A1* | 12/2013 | Yanakiev et al. | 374/1 |
| 2014/0251239 A1* | 9/2014 | Richards et al. | 123/41.05 |
| 2015/0019107 A1* | 1/2015 | Whitehead et al. | 701/102 |

\* cited by examiner

INTAKE TEMPERATURE CONTROL SYSTEMS AND METHODS FOR INTAKE MANIFOLD PROTECTION

FIELD

The present disclosure relates to internal combustion engines and more particularly to intake temperature control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts air and fuel to generate torque. Air flows into the engine through an intake system. The intake system may include a throttle valve and an intake manifold. Fuel is provided by one or more fuel injectors. The engine outputs torque to a transmission. The transmission transfers torque to one or more wheels. Exhaust resulting from combustion is expelled from the engine to an exhaust system.

An exhaust gas recirculation (EGR) system re-circulates exhaust back to the intake system. For exhaust to flow back to the intake system, pressure within the exhaust system must be greater than a pressure where the exhaust enters the intake system. The EGR system maybe controlled such that a target mixture of exhaust, air, and fuel is provided to each cylinder.

SUMMARY

In a feature, an engine control system of a vehicle includes a first temperature module, a second temperature module, and an exhaust gas recirculation (EGR) control module. The first temperature module determines a temperature of gas within an intake manifold of an engine. The second temperature module determines a temperature of an EGR conduit that is coupled to the intake manifold. The EGR control module reduces opening of an EGR valve when the temperature of the gas and the temperature of the conduit is greater than a predetermined temperature.

In further features, the predetermined temperature corresponds to a melting temperature of the intake manifold.

In still further features, the EGR control module reduces the opening of the EGR valve to a predetermined opening when the temperature of the gas and the temperature of the conduit is greater than the predetermined temperature.

In yet further features, the EGR control module fully closes the EGR valve when the temperature of the gas and the temperature of the conduit is greater than the predetermined temperature.

In further features, the EGR control module reduces the opening of the EGR valve when the temperature of the gas and the temperature of the conduit is greater than the predetermined temperature for a predetermined period.

In still further features, the EGR control module reduces the opening of the EGR valve until the temperature of the gas and the temperature of the conduit is less than a second predetermined temperature that is less than the predetermined temperature.

In yet further features, the EGR control module reduces the opening of the EGR valve until the temperature of the gas and the temperature of the conduit is less than the second predetermined temperature for a predetermined period.

In further features, when at least one of the temperature of the gas and the temperature of the conduit is greater than a third predetermined temperature that is less than the predetermined temperature, a coolant control module at least one of: turns on an electric coolant pump and increases a speed of the electric coolant pump.

In still further features, a coolant control module opens an electric thermostat valve when at least one of the temperature of the gas and the temperature of the conduit is greater than a third predetermined temperature that is less than the predetermined temperature.

In yet further features, a shutter control module that opens aerodynamic shutters of the vehicle when at least one of the temperature of the gas and the temperature of the conduit is greater than a third predetermined temperature that is less than the predetermined temperature.

In a feature, an engine control method for a vehicle includes: determining a temperature of gas within an intake manifold of an engine; determining a temperature of an exhaust gas recirculation (EGR) conduit that is coupled to the intake manifold; and reducing opening of an EGR valve when the temperature of the gas and the temperature of the conduit is greater than a predetermined temperature.

In further features, the predetermined temperature corresponds to a melting temperature of the intake manifold.

In still further features, the engine control method further includes reducing the opening of the EGR valve to a predetermined opening when the temperature of the gas and the temperature of the conduit is greater than the predetermined temperature.

In yet further features, the engine control method further includes fully closing the EGR valve when the temperature of the gas and the temperature of the conduit is greater than the predetermined temperature.

In further features, the engine control method further includes reducing the opening of the EGR valve when the temperature of the gas and the temperature of the conduit is greater than the predetermined temperature for a predetermined period.

In still further features, the engine control method further includes reducing the opening of the EGR valve until the temperature of the gas and the temperature of the conduit is less than a second predetermined temperature that is less than the predetermined temperature.

In yet further features, the engine control method further includes reducing the opening of the EGR valve until the temperature of the gas and the temperature of the conduit is less than the second predetermined temperature for a predetermined period.

In further features, the engine control method further includes, when at least one of the temperature of the gas and the temperature of the conduit is greater than a third predetermined temperature that is less than the predetermined temperature, at least one of: turning on an electric coolant pump; and increasing a speed of the electric coolant pump.

In still further features, the engine control method further includes opening an electric thermostat valve when at least one of the temperature of the gas and the temperature of the conduit is greater than a third predetermined temperature that is less than the predetermined temperature.

In yet further features, the engine control method further includes opening aerodynamic shutters of the vehicle when at least one of the temperature of the gas and the temperature of the conduit is greater than a third predetermined temperature that is less than the predetermined temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to produce drive torque for a vehicle. The engine draws air into the cylinders through an intake system. The intake system includes a throttle valve and an intake manifold. The engine outputs exhaust resulting from combustion to an exhaust system. An exhaust gas recirculation (EGR) system circulates exhaust from the exhaust system back to the intake system, such as to the intake manifold.

To reduce mass, the intake manifold may include one or more plastics. Under some circumstances, however, the intake manifold may experience high temperatures, and the intake manifold may melt and/or lose structural integrity. For example, the intake manifold may experience high temperatures when ambient air is hot, when high engine load conditions are present, and/or when an efficiency of a cooler (e.g., a charge cooler and/or an EGR cooler) decreases. The efficiency of a cooler may decrease, for example, when flow of a cooling medium (e.g., coolant and/or air) through the cooler is low or zero.

An engine control module (ECM) of the present disclosure estimates a temperature of gas within the intake manifold. The ECM also estimates a temperature of a metal EGR conduit that is connected to the intake manifold. The ECM reduces EGR flow when the temperature of the gas and/or the temperature of the EGR conduit is greater than a predetermined temperature above which the intake manifold may melt and/or be damaged. The ECM may also selectively take one or more other remedial actions to decrease the temperature of the gas and the temperature of the EGR conduit, such as increasing a speed of an electric coolant pump, opening an electric thermostat valve, and/or opening aerodynamic shutters.

Figure 1:
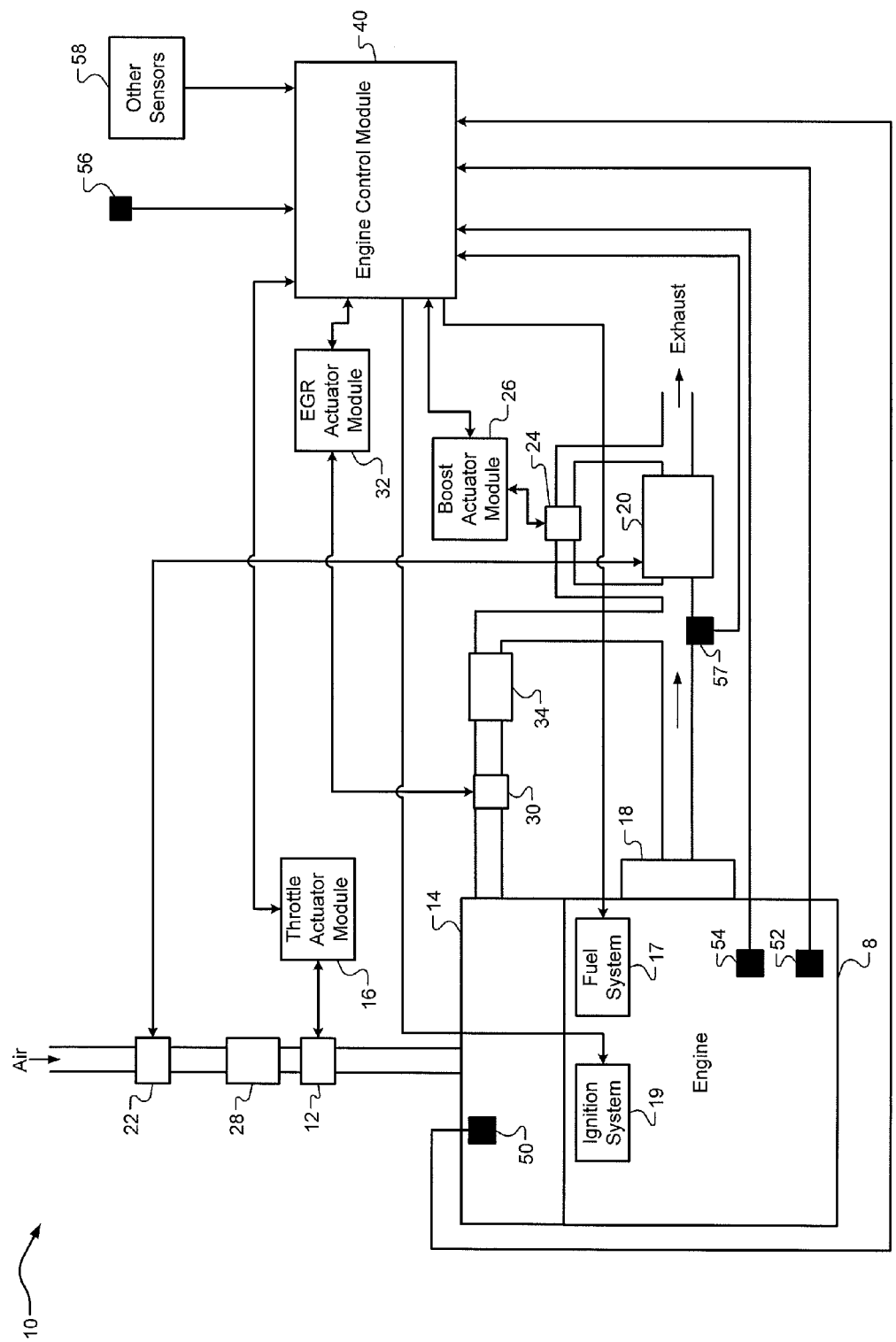
FIG. 1 is a functional block diagram of an example engine system according to the present disclosure.

Referring now to FIG. 1, a functional block diagram of an example engine system 10 is presented. While the engine system 10 will be discussed in terms of a spark ignition engine system, the present application is also applicable to other types of engine systems, such as compression ignition engine systems and hybrid engine systems.

Air is drawn into an engine 8 through an intake system including a throttle valve 12 and an intake manifold 14. The throttle valve 12 may regulate airflow into the intake manifold 14. The intake manifold 14 includes or is made of one or more plastics. A throttle actuator module 16 controls actuation of the throttle valve 12. The engine 8 combusts an air/fuel mixture within cylinders of the engine 8. A fuel system 17 selectively injects fuel into the engine 8. An ignition system 19 selectively provides spark to the engine 8 for combustion.

Combustion of the air/fuel mixture drives a crankshaft and produces exhaust. The engine 8 outputs the exhaust to an exhaust manifold 18. A one or more exhaust treatment devices, such as a catalyst, may react with various components of the exhaust. For example only, the catalyst may include a three-way catalyst (TWC), a catalytic converter, or another suitable type of catalyst.

Some engine systems, such as the example engine system of FIG. 1, include a turbocharger. The turbocharger includes a turbine 20 and a compressor 22. Exhaust output by the engine 8 drives rotation of the turbine 20. The turbine 20 and the compressor 22 are mechanically coupled such that the turbine 20 drives rotation of the compressor 22. The compressor 22 pressurizes air provided to the intake manifold 14. Some engine systems may include multiple (e.g., two) turbochargers.

A turbine bypass valve 24 controls exhaust flow bypassing the turbine 20. A boost actuator module 26 controls the turbine bypass valve 24. Exhaust bypassing the turbine 20 reduces exhaust flow through the turbine 20 and therefore reduces the output of the compressor 22. In various implementations, a wastegate may be implemented in place of the turbine bypass valve 24.

A charge cooler 28, such as a charge air cooler (CAC) or an intercooler, cools air output from the compressor 22. For example, a CAC transfers heat from the air output from the compressor 22 to air flowing through the CAC. An intercooler transfers heat from the air output from the compressor 22 to a coolant, such as engine coolant, flowing through the intercooler. The charge cooler 28 may be omitted in some engine systems having one or more turbochargers. In engine systems without a turbocharger, the turbine 20, the compressor 22, the turbine bypass valve 24, and the charge cooler 28 may be omitted.

An EGR valve 30 recirculates exhaust back to the intake system, such as to the intake manifold 14. Exhaust may be recirculated back to another suitable location in the intake system, such as upstream of the compressor 22. An EGR actuator module 32 controls the EGR valve 30. An EGR cooler 34 may be implemented to cool exhaust being recirculated back to the intake system. A cooler bypass system (not shown) including an EGR cooler bypass valve may be implemented to control exhaust bypassing the EGR cooler 34. The conduit through which exhaust is recirculated back to the intake system includes metal due to the high temperatures of exhaust.

An engine control module (ECM) 40 regulates operation of the engine system 10. For example, the ECM 40 controls opening of the throttle valve 12 via the throttle actuator module 16, opening of the EGR valve 30 via the EGR actuator module 32, fuel injection amount and timing via the fuel system 17, spark timing via the ignition system 19, and output of the turbocharger via the boost actuator module 26. The ECM 40 may also control operation of intake and exhaust valve actuators and/or one or more other suitable engine actuators.

The ECM 40 communicates with various sensors, such as a manifold absolute pressure (MAP) sensor 50, a crankshaft position sensor 52, a coolant temperature sensor 54, an ambient air temperature sensor 56, and an exhaust temperature sensor 57. The MAP sensor 50 generates a MAP signal indicating an absolute pressure in the intake manifold 14. The crankshaft position sensor 52 generates a signal based on rotation of the crankshaft. An engine speed, in revolutions per minute (RPM), can be determined based on the rotation of the crankshaft.

The coolant temperature sensor 54 generates a coolant temperature signal indicating a temperature of engine coolant, such as a temperature of coolant at a coolant outlet of the engine 8. The ambient air temperature sensor 56 generates an air temperature signal based on a temperature of ambient air. The exhaust temperature sensor 57 generates an exhaust temperature signal based on a temperature of exhaust.

The engine system 10 may also include one or more other sensors 58. The other sensors 58 may include, for example, a mass airflow (MAF) sensor, a charge cooler output temperature sensor, an EGR cooler output temperature sensor, an oil temperature sensor, an intake air temperature sensor, and/or other suitable types of sensors.

Figure 2:
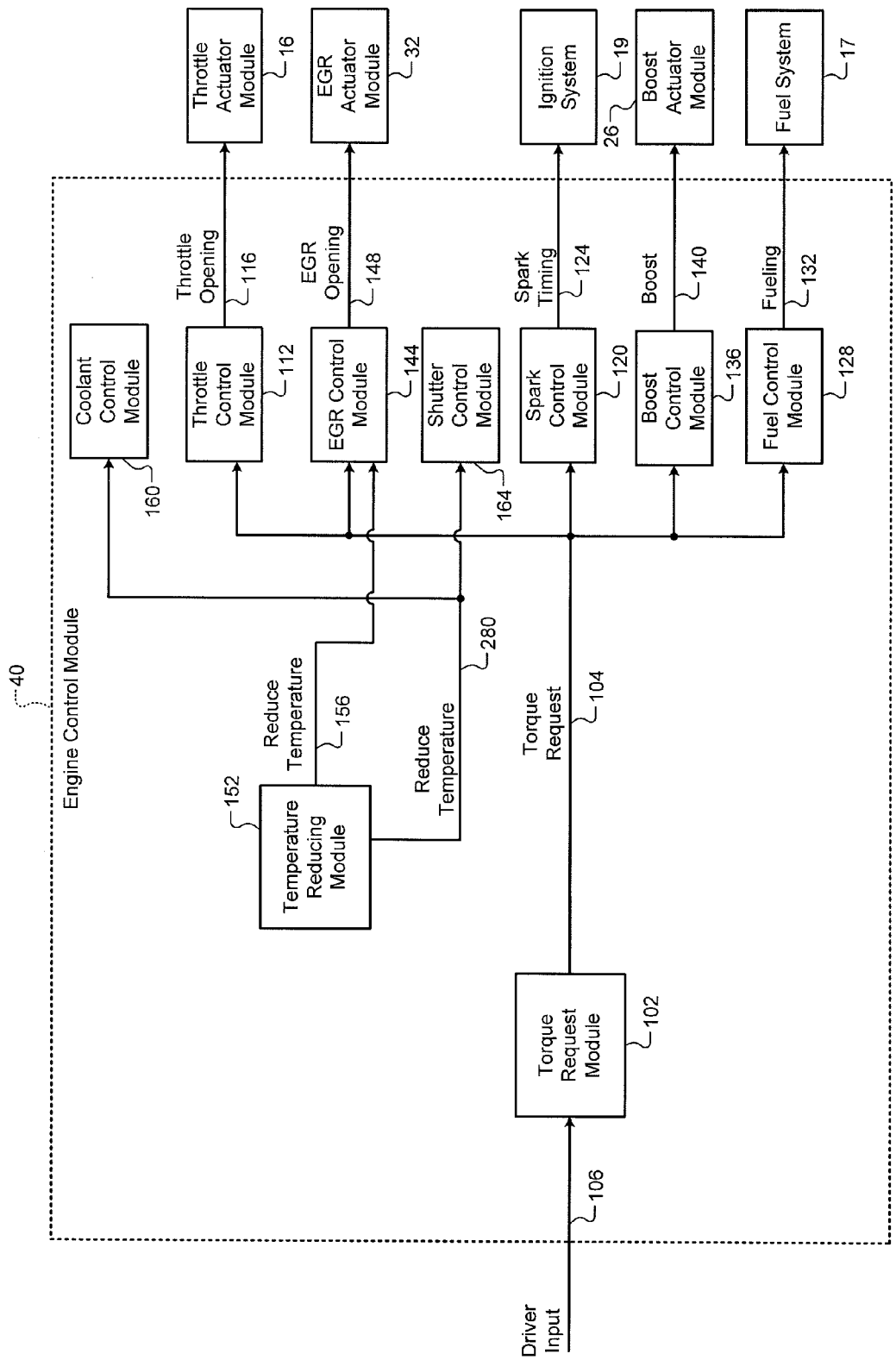
FIG. 2 is a functional block diagram of an example engine control system according to the present disclosure.

Referring now to FIG. 2, a functional block diagram of an example implementation of the ECM 40 is presented. A torque request module 102 determines a torque request 104 based on one or more driver inputs 106, such as an accelerator pedal position, a brake pedal position, a cruise control input, and/or one or more other suitable driver inputs. The torque request module 102 may determine the torque request 104 additionally or alternatively based on one or more other torque requests, such as torque requests generated by the ECM 40 and/or torque requests received from other modules of the vehicle, such as a transmission control module, a hybrid control module, a chassis control module, etc.

One or more engine actuators may be controlled based on the torque request 104 and/or one or more other vehicle operating parameters. For example, a throttle control module 112 may determine a target throttle opening 116 based on the torque request 104. The throttle actuator module 16 adjusts opening of the throttle valve 12 based on the target throttle opening 116. A spark control module 120 may determine a target spark timing 124 based on the torque request 104. The ignition system 19 generates spark based on the target spark timing 124.

A fuel control module 128 may determine one or more target fueling parameters 132 based on the torque request 104. For example, the target fueling parameters 132 may include number of fuel injection pulses (per combustion event), timing for each pulse, and amount for each pulse. The fuel system 17 injects fuel based on the target fueling parameters 132.

A boost control module 136 may determine a target boost 140 based on the torque request 104. The boost actuator module 26 adjusts opening of the turbine bypass valve 24 based on the target boost 140 to cause the compressor 22 to achieve the target boost 140. An EGR control module 144 may determine a target EGR opening 148 based on the torque request 104. The EGR actuator module 32 adjusts opening of the EGR valve 30 based on the target EGR opening 148.

Under some circumstances, a temperature reducing module 152 (see also FIG. 3) generates a first reduce temperature command 156 to reduce one or more temperatures of the intake manifold 14. For example, the temperature reducing module 152 may generate the first reduce temperature command 156 when an intake manifold temperature is greater than a predetermined temperature. The intake manifold 14 may melt and/or lose structural integrity when the intake manifold temperature is greater than the predetermined temperature.

Figure 3:
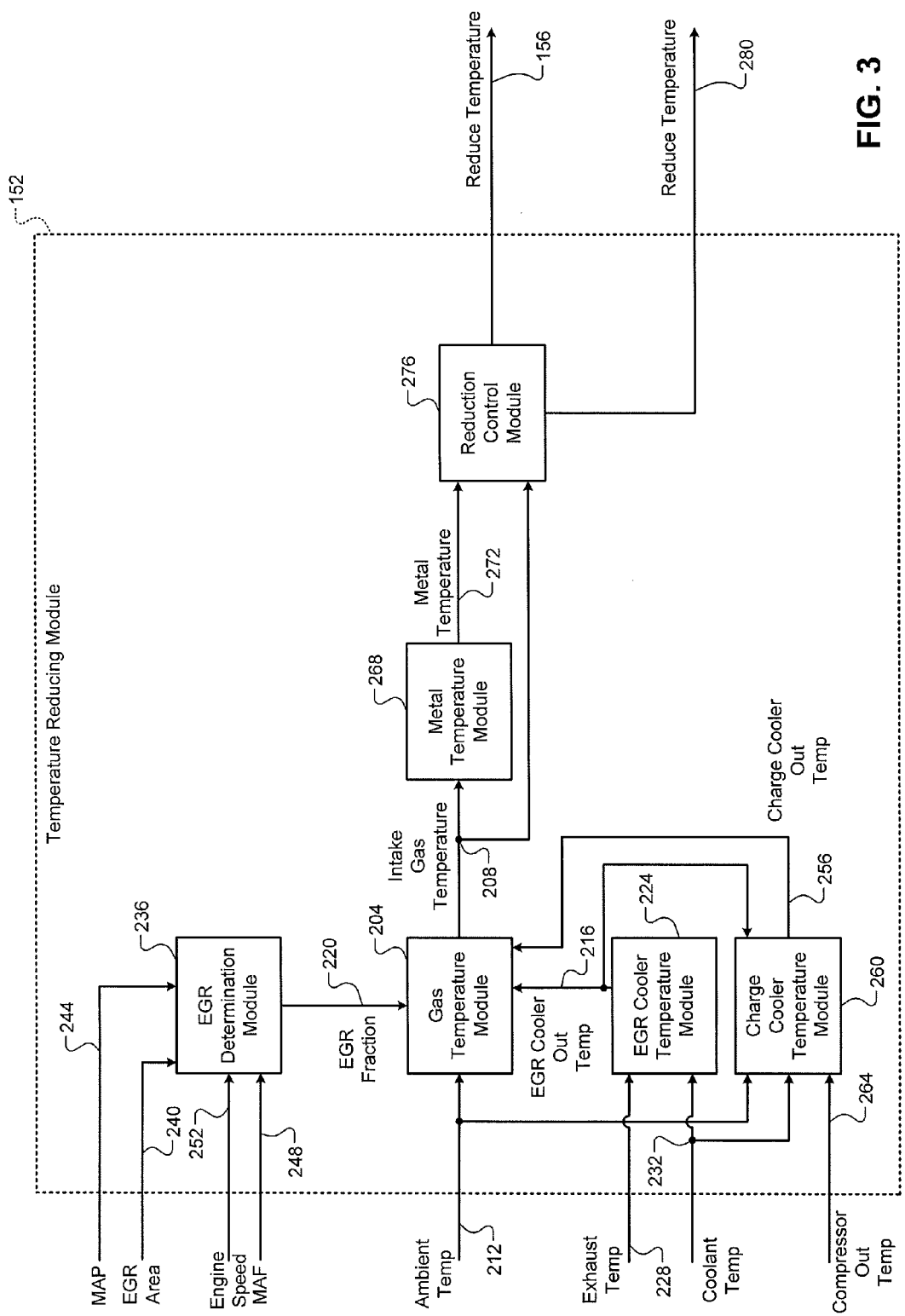
FIG. 3 is a functional block diagram of an example temperature reducing module according to the present disclosure.

Referring now to FIG. 3, a functional block diagram of an example implementation of the temperature reducing module 152 is presented. A gas temperature module 204 determines an intake (manifold) gas temperature 208. The intake gas temperature 208 may correspond to a temperature of the mixture of gasses within the intake manifold 14.

For non-boosted engines, the gas temperature module 204 determines the intake gas temperature 208 based on an ambient temperature 212, an EGR cooler outlet temperature 216, and an EGR mass fraction 220. For example, the gas temperature module 204 may determine the intake gas temperature 208 using the equation:

$$\text{IM Gas Temp} = \text{EGR Cooler Out Temp} * \text{EGR Mass Fraction} + \text{Amb Temp} * (1 - \text{EGR Mass Fraction}),$$

where IM Gas Temp is the intake gas temperature 208, EGR Cooler Out Temp is the EGR cooler outlet temperature 216, Amb Temp is the ambient temperature 212, and EGR Mass Fraction is the EGR mass fraction 220. The ambient temperature 212 may be measured using the ambient air temperature sensor 56. The EGR cooler outlet temperature 216 may be measured using a sensor or determined, as discussed further below. The EGR mass fraction 220 may be a value between 0.0 and 1.0 (corresponding to 0 percent and 100 percent) and may be determined as discussed further below.

An EGR cooler temperature module 224 may determine the EGR cooler outlet temperature 216. The EGR cooler outlet temperature 216 may refer to a temperature at an outlet of the EGR cooler 34. The EGR cooler temperature module 224 may determine the EGR cooler outlet temperature 216 based on an exhaust temperature 228, a coolant temperature 232, and an efficiency of the EGR cooler 34. For example, the EGR cooler temperature module 224 may determine the EGR cooler outlet temperature 216 using the equation:

$$\text{EGR Cooler Out Temp} = \text{Exh Temp} - \text{Cooler Eff} * (\text{Exh Temp} - \text{Coolant Temp}),$$

where EGR Cooler Out Temp is the EGR cooler outlet temperature 216, Exh Temp is the exhaust temperature 228, Cooler Eff is the efficiency of the EGR cooler 34, and Coolant Temp is the coolant temperature 232. The exhaust temperature 228 may be, for example, measured using the exhaust temperature sensor 57 or determined based on one or more other parameters. The coolant temperature 232 may be measured, for example, using the coolant temperature sensor 52. The EGR cooler efficiency may be set to a predetermined maximum value (e.g., approximately 1.0) initially, and the EGR cooler temperature module 224 may selectively decrease the EGR cooler efficiency over time as the EGR cooler 34 ages.

An EGR determination module 236 determines the EGR mass fraction 220. The EGR mass fraction 220 may correspond to an expected mass fraction of EGR to the (total) mass of a gas charge of a future (e.g., next) combustion event of the engine 8 or to a mass fraction of EGR to the total mass of gas within the intake manifold 14.

The EGR determination module 236 may determine a steady-state (SS) EGR flowrate. The SS EGR flowrate corresponds to a mass flowrate of EGR back to the intake manifold 14 under SS EGR conditions. SS EGR conditions may refer to periods when the SS EGR flowrate varies less than a predetermined amount over a predetermined period.

The EGR determination module 236 may determine the SS EGR flowrate using the relationship:

$$\dot{m}_{EGR} = \frac{C_D * A_T * p_O}{\sqrt{R * T_O}} * \left(\frac{p_T}{p_O}\right)^{\frac{1}{\gamma}} * \left\{\frac{2*\gamma}{\gamma-1} * \left[1 - \left(\frac{p_T}{p_O}\right)^{\frac{(\gamma-1)}{\gamma}}\right]\right\}^{\frac{1}{2}}$$

where ($\dot{m}_{EGR}$) is the (present) mass flowrate of EGR back to the engine 8 via the EGR system (i.e., the SS EGR flowrate) and is a function of opening area ($A_T$) 240 of the EGR valve 30, a pressure ($p_O$)) upstream of the EGR valve 30, a temperature ($T_O$) (e.g., the exhaust temperature 228), a pressure ($p_r$) downstream of the EGR valve 30 (e.g., a pressure 244 within the intake manifold 14), and various constants ($C_D$, R, γ). This relationship may be embodied as equation, such as the equation above, or as a mapping (e.g., a lookup table) that relates the above parameters to the SS EGR flowrate. The pressure 244 within the intake manifold 14 may be measured using the MAP sensor 50. An EGR position sensor may measure a position of the EGR valve 30, and the opening area 240 of the EGR valve 30 may be determined based on the position of the EGR valve 30.

For each combustion event of the engine 8, a gas charge is drawn into a cylinder. The gas charge may include: ambient air drawn through the throttle valve 12; and exhaust gas recirculated back via the EGR system. The gas charge may also include one or more other gasses, such as fuel vapor provided by a fuel vapor purge system (not shown).

The EGR determination module 236 determines a SS EGR fraction for a next combustion event of the engine 8. The SS EGR fraction corresponds to a mass fraction of EGR under SS EGR conditions to the mass of the gas charge of the next combustion event of the engine 8. The EGR determination module 236 determines the SS EGR fraction for the next combustion event based on the SS EGR flowrate and a mass air flowrate (MAF) 248 into the intake manifold 14. The MAF 248 may be measured using a MAF sensor. The EGR determination module 236 may determine the SS EGR fraction for the next combustion event, for example, using the equation:

$$SSFraction = \frac{\dot{m}_{EGR}}{\dot{m}_{EGR} + \dot{m}_{MAF}},$$

where SSFraction is the SS EGR fraction and is a function of the SS EGR flowrate ($\dot{m}_{EGR}$) and the MAF ($\dot{m}_{MAF}$) 248.

The EGR determination module 236 may include a ring buffer, a first-in first-out (FIFO) buffer, a shift register, etc. The EGR determination module 236 includes a predetermined number of the most recently determined values of the SS EGR fraction. Each time the SS EGR fraction is determined, the EGR determination module 236 stores the SS EGR fraction and removes an oldest stored value of the SS EGR fraction.

The EGR determination module 236 determines the EGR mass fraction 220 for the next combustion event of the engine 8 based on a plurality of the stored values of the SS EGR fraction. The EGR determination module 236 may determine the EGR mass fraction 220 for the next combustion event based on an average, such as a weighted average, of a plurality of the stored values of the SS EGR fraction. The values of the SS EGR fraction used to determine the EGR mass fraction 220 may be the most recently determined/stored values.

The EGR determination module 236 may determine the EGR mass fraction 220 for the next combustion event, for example, using the equation:

$$EGRFraction = \frac{\left(\sum_{i=0}^{t-d}(t-d-i)*SSFrac_{t-1-i}\right)}{\left(\sum_{i=0}^{t-d}(t-d-i)\right)},$$

where EGRFraction is the EGR mass fraction 220, t is a number of combustion events between a combustion event of the engine 8 and a later combustion event where the EGR mass fraction 220 will reach SS (and therefore be equal to the SS EGR fraction) after a transient EGR condition occurs, d is a number of combustion events between a combustion event when a command is made that will cause a transient EGR condition and a later combustion event when the EGR mass fraction 220 will begin to change in response to the command, and SSFrac refers to the one of the stored values of the SS EGR fraction for the combustion event t−1−i combustion events ago. t and d are integers, and d is less than t. An EGR transient condition can occur, for example, in response to changes in the opening of the throttle valve 12, changes in the opening of the EGR valve 30, changes in pressure within the intake manifold 14, or another suitable event that causes a change in the mass flowrate of EGR back to the intake system.

In various implementations, t and d may be constant values that are calibrated based on physical factors, such as cylinder volume, volume of the intake manifold 14, and volume of the EGR system through which exhaust travels when recirculated. In various implementations, t and/or d may be variable values and may be set by the EGR determination module 236. The EGR determination module 236 may set t and/or d, for example, using one or more functions or mappings that relate an engine load parameter, such as an amount of air per cylinder (APC), and/or an engine speed 252 to t and/or d. The one or more functions or mappings are calibrated based on the physical factors, such as the cylinder volume, the volume of the intake manifold 14, and the volume of the EGR system.

For engine systems having a turbocharger, such as the example engine system of FIG. 1, the gas temperature module 204 may determine the intake gas temperature 208 based on the EGR cooler outlet temperature 216, a charge cooler outlet temperature 256, and the EGR mass fraction 220. For example, the gas temperature module 204 may determine the intake gas temperature 208 using the equation:

IM Gas Temp=EGR Cooler Out Temp*EGR Mass Fraction+Charge Cooler Out Temp*(1−EGR Mass Fraction), where IM Gas Temp is the intake gas temperature 208, EGR Cooler Out Temp is the EGR cooler outlet temperature 216, Charge Cooler Outlet Temp is the charge cooler outlet temperature 256, and EGR Mass Fraction is the EGR mass fraction 220. The charge cooler outlet temperature 256 may be measured using a sensor or determined, for example, as discussed below. The charge cooler outlet temperature 256 may correspond to a temperature at an outlet of the charge cooler 28.

A charge cooler temperature module 260 may determine the charge cooler outlet temperature 256. For engine systems where the charge cooler 28 is an intercooler, the charge cooler temperature module 260 may determine the charge cooler outlet temperature 256 based on a compressor outlet temperature 264, the coolant temperature 232, and an efficiency of the intercooler. For example, the charge cooler temperature module 260 may determine the charge cooler outlet temperature 256 for an engine system including an intercooler using the equation:

Charge Cooler Out Temp=Comp Out Temp−Charge Cooler Eff*(Com Out Temp−Coolant Temp), where Charge Cooler Out Temp is the charge cooler outlet temperature 256, Comp Out Temp is the compressor outlet temperature 264, Coolant Temp is the coolant temperature 232, and Charge Cooler Eff is the efficiency of the intercooler. The charge cooler efficiency may be set to a predetermined maximum value (e.g., approximately 1.0) initially, and the charge cooler temperature module 260 may selectively decrease the charge cooler efficiency over time as the intercooler ages. The compressor outlet temperature 264 may, for example, be measured using a sensor. The compressor outlet temperature 264 may correspond to a temperature at an outlet of the compressor 22.

For engine systems where the charge cooler 28 is a charge air cooler (CAC), the charge cooler temperature module 260 may determine the charge cooler outlet temperature 256 based on the compressor outlet temperature 264, the ambient temperature 212, and an efficiency of the CAC. For example, the charge cooler temperature module 260 may determine the charge cooler outlet temperature 256 for an engine system including a CAC using the equation:

Charge Cooler Out Temp=Comp Out Temp−Charge Cooler Eff*(Com Out Temp−Amb Temp), where Charge Cooler Out Temp is the charge cooler outlet temperature 256, Comp Out Temp is the compressor outlet temperature 264, Amb Temp is the ambient temperature 212, and Charge Cooler Eff is the efficiency of the CAC. The charge cooler efficiency may be set to a predetermined maximum value (e.g., approximately 1.0) initially, and the charge cooler temperature module 260 may selectively decrease the charge cooler efficiency over time as the CAC ages.

For engine systems where the EGR is provided upstream of the compressor 22, the charge cooler temperature module 260 may determine the charge cooler outlet temperature 256 further based on the EGR mass fraction 220 and the EGR cooler outlet temperature 216. For example, the charge cooler temperature module 260 may determine the charge cooler outlet temperature 256 for engine systems where the EGR is provided upstream of the compressor 22 using the equation:

Charge Cooler Out Temp=Comp Out Temp−Charge Cooler Eff*[Com Out Temp−(1−EGR Mass Fraction)*Amb Temp+EGR Mass Fraction*EGR Cooler Out Temp)], where Charge Cooler Out Temp is the charge cooler outlet temperature 256, Comp Out Temp is the compressor outlet temperature 264, Amb Temp is the ambient temperature 212, Charge Cooler Eff is the efficiency of the CAC, EGR Mass Fraction is the EGR mass fraction 220, and EGR Cooler Out Temp is the EGR cooler outlet temperature 216.

A metal temperature module 268 determines a metal temperature 272 based on the intake gas temperature 208. The metal temperature 272 may correspond to a temperature of one or more metal components at the location where recirculated exhaust is provided to the intake system, such as the metal EGR conduit at the location where the EGR system connects to the intake system. The metal temperature module 268 determines the metal temperature 272 further based on a predetermined temperature offset. For example, the metal temperature module 268 may set the metal temperature 272 equal to or based on the intake gas temperature 208 plus the predetermined temperature offset. The predetermined temperature offset may be calibratable and may be set, for example, to approximately 30 degrees Celsius or another suitable temperature.

A reduction control module 276 selectively generates the first reduce temperature command 156 based on at least one of the intake gas temperature 208 and the metal temperature 272. For example only, the reduction control module 276 may set the first reduce temperature command 156 to a first state when the intake gas temperature 208 and/or the metal temperature 272 is greater than a first predetermined temperature. The reduction control module 276 may require that the intake gas temperature 208 and/or the metal temperature 272 be greater than the first predetermined temperature for a first predetermined period before setting the first reduce temperature command 156 to the first state.

The first predetermined temperature may be calibratable and may be set to a temperature above which the intake manifold 14 may melt and/or lose structural integrity. For example only, the first predetermined temperature may be approximately 150 degrees Celsius or another suitable temperature.

One or more remedial actions are selectively taken to reduce the one or more temperatures of the intake manifold 14. Referring now to FIGS. 2 and 3, for example, the EGR control module 144 reduces the target EGR opening 148 when the first reduce temperature command 156 is in the first state. The EGR control module 144 may reduce the target EGR opening 148 to a predetermined opening when the first reduce temperature command 156 is in the first state. The predetermined opening may be zero percent open (to prevent EGR flow) or may be greater than zero percent open (to allow for a predetermined minimum amount of EGR flow).

The reduction control module 276 may transition the first reduce temperature command 156 from the first state to a second state when the intake gas temperature 208 and the metal temperature 272 are less than a second predetermined temperature. The reduction control module 276 may require that the intake gas temperature 208 and the metal temperature 272 be less than the second predetermined temperature for a second predetermined period before transitioning the first reduce temperature command 156 to the second state.

The second predetermined temperature is less than the first predetermined temperature. For example only, the second predetermined temperature may be approximately 140 degrees Celsius or another suitable temperature. The EGR control module 144 may increase the target EGR opening 148 when the first reduce temperature command 156 is in the second state.

One or more other remedial actions may be taken to decrease the intake gas temperature 208 and the metal temperature 272 when the intake gas temperature 208 and/or the metal temperature 272 is greater than a third predetermined temperature. The third predetermined temperature is less than the second predetermined temperature. For example only, the third predetermined temperature may be approximately 130 degrees Celsius or another suitable temperature. In this manner, one or more other remedial actions may be taken to decrease the intake gas temperature 208 and the metal temperature 272 before EGR flow is reduced.

For example, a coolant control module 160 may turn on and/or increase a speed of an electric coolant pump (not shown) when the intake gas temperature 208 and/or the metal temperature 272 is greater than the third predetermined temperature. Turning on and/or increasing the speed of a coolant pump may increase cooling and therefore decrease the intake gas temperature 208 and the metal temperature 272.

Additionally or alternatively, the coolant control module 160 may open an electric thermostat valve (not shown) when the intake gas temperature 208 and/or the metal temperature 272 is greater than the third predetermined temperature. Opening a thermostat valve may increase cooling of the intake manifold 14 and therefore decrease the intake gas temperature 208 and the metal temperature 272.

Additionally or alternatively, a shutter control module 164 may open aerodynamic shutters (not shown) of the vehicle when the intake gas temperature 208 and/or the metal temperature 272 is greater than the third predetermined temperature. When open, the aerodynamic shutters allow air into an engine compartment. Opening the aerodynamic shutters may therefore increase cooling of the intake manifold 14 and decrease the intake gas temperature 208 and the metal temperature 272.

The reduction control module 276 may generate a second reduce temperature command 280 when the intake gas temperature 208 and/or the metal temperature 272 is greater than the third predetermined temperature. The coolant control module 160 may turn on the electric coolant pump, increase the speed of the electric coolant pump, and/or open the electric thermostat valve when the second reduce temperature command 280 is generated. Additionally or alternatively, the shutter control module 164 may open the aerodynamic shutters when the second reduce temperature command 280 is generated.

Figure 4:
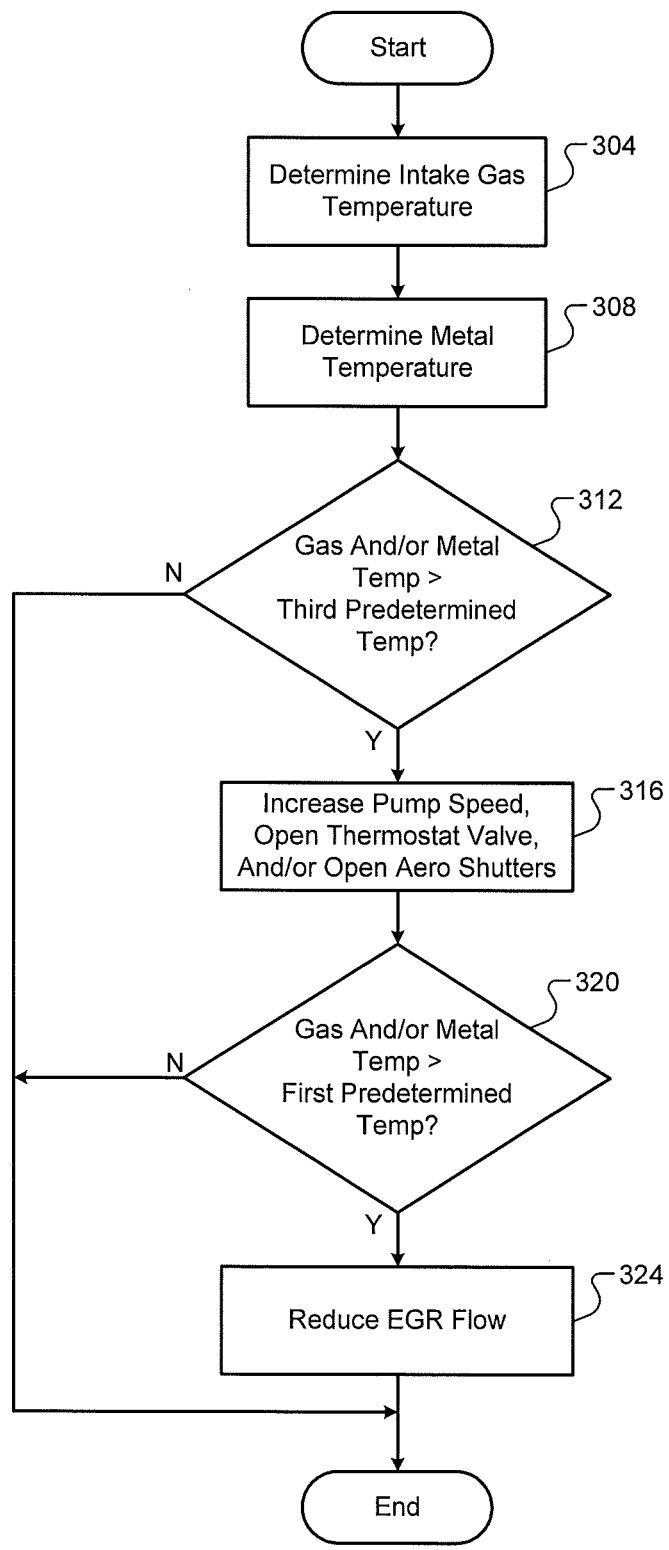
FIG. 4 is a flowchart depicting an example method of controlling intake manifold temperatures according to the present disclosure.

Referring now to FIG. 4, a flowchart depicting an example method of controlling the intake gas temperature 208 and the metal temperature 272 is presented. Control may begin with 304 where the gas temperature module 204 determines the intake gas temperature 208. At 308, the metal temperature module 268 determines the metal temperature 272. Determination of the intake gas temperature 208 and the metal temperature 272 is described above.

At 312, the reduction control module 276 determines whether the intake gas temperature 208 and/or the metal temperature 272 is greater than the third predetermined value. If 312 is true, the reduction control module 276 generates the second reduce temperature command 280, and control continues with 316. At 316, the coolant control module 160 may turn on the electric coolant pump, increase the speed of the electric coolant pump, and/or open the electric thermostat valve. Additionally or alternatively, the shutter control module 164 may open the aerodynamic shutters at 316. If 312 is false, control may end. The third predetermined temperature is less than the first and second predetermined temperatures and may be, for example, approximately 130 degrees Celsius or another suitable temperature.

Control continues with 320 after 316. At 320, the reduction control module 276 determines whether the intake gas temperature 208 and/or the metal temperature 272 is greater than the first predetermined temperature. If 320 is true, the reduction control module 276 sets the first reduce temperature command 156 to the first state, and control continues with 324. If 320 is false, control may end. The first predetermined temperature is greater than the second predetermined temperature may be approximately 150 degrees Celsius or another suitable temperature. The reduction control module 276 may require that the intake gas temperature 208 and/or the metal temperature 272 be greater than the first predetermined temperature for a first predetermined period before setting the first reduce temperature command 156 to the first state.

The EGR control module 144 reduces the target EGR opening 148 to the predetermined opening at 324 when the first reduce temperature command 156 is in the first state. The predetermined opening may be zero percent open (to prevent EGR flow) or may be greater than zero percent open (to allow for a predetermined minimum amount of EGR flow). While control is shown and discussed as ending, the example of FIG. 4 may be illustrative of one control loop, and control loops may be executed at a predetermined rate.

Figure 5:
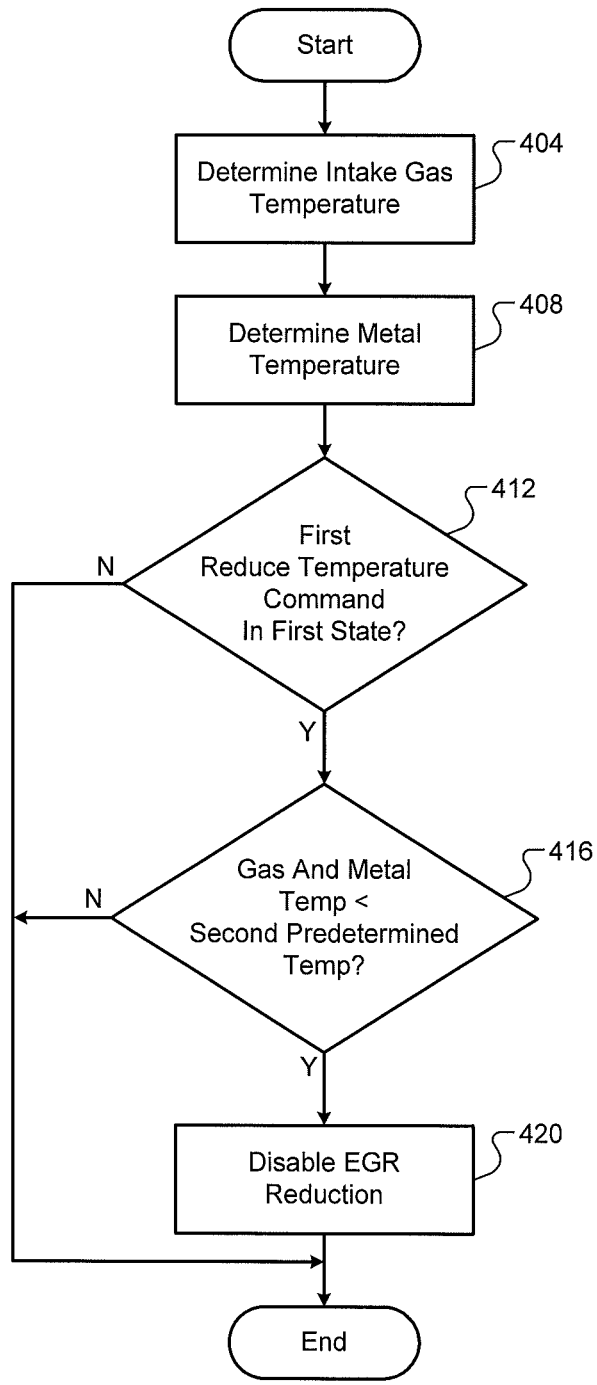
FIG. 5 is a flowchart depicting an example method of disabling a reduction in exhaust gas recirculation commanded to decrease intake manifold temperatures according to the present disclosure.

Referring now to FIG. 5, a flowchart depicting an example method of disabling a reduction in EGR commanded to decrease the intake gas temperature 208 and the metal temperature 272 is presented. Control may begin with 404 where the gas temperature module 204 determines the intake gas temperature 208. At 408, the metal temperature module 268 determines the metal temperature 272. Determination of the intake gas temperature 208 and the metal temperature 272 is described above.

At 412, the reduction control module 276 determines whether the first reduce temperature command 156 is in the first state. If 412 is true, control continues with 416. If 412 is false, control may end. At 416, the reduction control module 276 determines whether the intake gas temperature 208 and the metal temperature 272 are both less than the second predetermined temperature. If 416 is true, control continues with 420. If 416 is false, control may end. The reduction control module 276 may require that the intake gas temperature 208 and the metal temperature 272 be less than the second predetermined temperature for a second predetermined period before transitioning the first reduce temperature command 156 to the second state.

The second predetermined temperature is less than the first predetermined temperature and greater than the third predetermined temperature. For example only, the second predetermined temperature may be approximately 140 degrees Celsius or another suitable temperature.

The reduction control module 276 transitions the first reduce temperature command 156 from the first state to the second state at 420 to disable the reduction in EGR flow commanded to reduce the intake gas temperature 208 and the metal temperature 272. The EGR control module 144 may thereafter selectively increase the target EGR opening 148. While control is shown and discussed as ending, the example of FIG. 5 may be illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system of a vehicle, comprising:
   a first temperature module that determines a temperature of gas within an intake manifold of an engine;
   a second temperature module that determines a temperature of an exhaust gas recirculation (EGR) conduit that is coupled to the intake manifold based on a sum of the temperature of the gas within the intake manifold and a predetermined temperature offset; and
   an EGR control module that reduces opening of an EGR valve when the temperature of the gas and the temperature of the conduit is greater than a predetermined temperature.

2. The engine control system of claim 1 wherein the predetermined temperature corresponds to a melting temperature of the intake manifold.

3. The engine control system of claim 1 wherein the EGR control module reduces the opening of the EGR valve to a predetermined opening when the temperature of the gas and the temperature of the conduit is greater than the predetermined temperature.

4. The engine control system of claim 1 wherein the EGR control module fully closes the EGR valve when the temperature of the gas and the temperature of the conduit is greater than the predetermined temperature.

5. The engine control system of claim 1 wherein the EGR control module reduces the opening of the EGR valve when the temperature of the gas and the temperature of the conduit is greater than the predetermined temperature for a predetermined period.

6. The engine control system of claim 1 wherein the EGR control module reduces the opening of the EGR valve until the temperature of the gas and the temperature of the conduit is less than a second predetermined temperature that is less than the predetermined temperature.

7. The engine control system of claim 6 wherein the EGR control module reduces the opening of the EGR valve until the temperature of the gas and the temperature of the conduit is less than the second predetermined temperature for a predetermined period.

8. The engine control system of claim 1 further comprising a coolant control module that at least one of turns on an electric coolant pump and increases a speed of the electric coolant pump when at least one of the temperature of the gas and the temperature of the conduit is greater than a third predetermined temperature that is less than the predetermined temperature.

9. The engine control system of claim 1 further comprising a coolant control module that opens an electric thermostat valve when at least one of the temperature of the gas and the temperature of the conduit is greater than a third predetermined temperature that is less than the predetermined temperature.

10. The engine control system of claim 1 further comprising a shutter control module that opens aerodynamic shutters of the vehicle when at least one of the temperature of the gas and the temperature of the conduit is greater than a third predetermined temperature that is less than the predetermined temperature.

11. An engine control method for a vehicle, comprising:
    determining a temperature of gas within an intake manifold of an engine;
    determining a temperature of an exhaust gas recirculation (EGR) conduit that is coupled to the intake manifold based on a sum of the temperature of the gas within the intake manifold and a predetermined temperature offset; and
    reducing opening of an EGR valve when the temperature of the gas and the temperature of the conduit is greater than a predetermined temperature.

12. The engine control method of claim 11 wherein the predetermined temperature corresponds to a melting temperature of the intake manifold.

13. The engine control method of claim 11 further comprising reducing the opening of the EGR valve to a predetermined opening when the temperature of the gas and the temperature of the conduit is greater than the predetermined temperature.

14. The engine control method of claim 11 further comprising fully closing the EGR valve when the temperature of the gas and the temperature of the conduit is greater than the predetermined temperature.

15. The engine control method of claim 11 further comprising reducing the opening of the EGR valve when the temperature of the gas and the temperature of the conduit is greater than the predetermined temperature for a predetermined period.

16. The engine control method of claim 11 further comprising reducing the opening of the EGR valve until the temperature of the gas and the temperature of the conduit is less than a second predetermined temperature that is less than the predetermined temperature.

17. The engine control method of claim 16 further comprising reducing the opening of the EGR valve until the temperature of the gas and the temperature of the conduit is less than the second predetermined temperature for a predetermined period.

18. The engine control method of claim 11 further comprising, when at least one of the temperature of the gas and the temperature of the conduit is greater than a third predetermined temperature that is less than the predetermined temperature, at least one of:
    turning on an electric coolant pump; and
    increasing a speed of the electric coolant pump.

19. The engine control method of claim 11 further comprising opening an electric thermostat valve when at least one of the temperature of the gas and the temperature of the conduit is greater than a third predetermined temperature that is less than the predetermined temperature.

20. The engine control method of claim 11 further comprising opening aerodynamic shutters of the vehicle when at least one of the temperature of the gas and the temperature of the conduit is greater than a third predetermined temperature that is less than the predetermined temperature.

21. An engine control system of a vehicle, comprising:
a first temperature module that determines a temperature of gas within an intake manifold of an engine;
a second temperature module that determines a temperature of an exhaust gas recirculation (EGR) conduit that is coupled to the intake manifold;
an EGR control module that reduces opening of an EGR valve when the temperature of the gas and the temperature of the conduit is greater than a first predetermined temperature, wherein the first predetermined temperature is based on a melting temperature of the intake manifold; and
a coolant control module that, when the temperature of the gas and the temperature of the conduit is greater than a second predetermined temperature, at least one of (i) turns on an electric coolant pump and (ii) increases a speed of the electric coolant pump,
wherein the second predetermined temperature is less than the first predetermined temperature.

* * * * *